(12) United States Patent
Lunzer et al.

(10) Patent No.: US 9,914,800 B2
(45) Date of Patent: Mar. 13, 2018

(54) AQUEOUS DISPERSIONS OF A MULTIFUNCTIONAL PRIMARY AMINE, PROCESS FOR ITS PREPARATION, AND USE THEROF

(71) Applicant: Allnex Austria GmbH, Werndorf (AT)

(72) Inventors: Florian Lunzer, Graz (AT); Gerald Hobisch, Hart bei Graz (AT); Michaela Zirngast, Graz (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 24 days.

(21) Appl. No.: 14/434,519

(22) PCT Filed: Nov. 6, 2013

(86) PCT No.: PCT/EP2013/073096
§ 371 (c)(1),
(2) Date: Apr. 9, 2015

(87) PCT Pub. No.: WO2014/072308
PCT Pub. Date: May 15, 2014

(65) Prior Publication Data
US 2015/0274881 A1 Oct. 1, 2015

(30) Foreign Application Priority Data
Nov. 6, 2012 (EP) .................................. 12191430

(51) Int. Cl.
| C08G 59/50 | (2006.01) |
| C09D 5/02 | (2006.01) |
| C08G 59/18 | (2006.01) |
| C09D 163/00 | (2006.01) |

(52) U.S. Cl.
CPC ....... *C08G 59/5006* (2013.01); *C08G 59/182* (2013.01); *C08G 59/50* (2013.01); *C09D 5/022* (2013.01); *C09D 163/00* (2013.01)

(58) Field of Classification Search
CPC .................................................. C08G 59/5006
See application file for complete search history.

(56) References Cited

U.S. PATENT DOCUMENTS

| 4,017,438 A * | 4/1977 | Jerabek ................ C09D 5/4438 204/501 |
| 4,197,389 A | 4/1980 | Becker et al. |
| 4,198,331 A | 4/1980 | Buchwalter et al. |
| 4,454,265 A | 6/1984 | Tortorello et al. |
| 5,097,070 A | 3/1992 | Lin et al. |
| 5,288,802 A | 2/1994 | Walters et al. |
| 6,258,919 B1 | 7/2001 | Vogel et al. |
| 8,143,331 B2 | 3/2012 | Raymond et al. |
| 2003/0001135 A1 | 1/2003 | Gerlitz et al. |
| 2005/0256229 A1* | 11/2005 | Shimasaki ......... C08G 18/3256 523/415 |
| 2005/0282936 A1* | 12/2005 | Toi ........................ C08G 18/283 523/414 |
| 2008/0008895 A1* | 1/2008 | Garner .................... C04B 26/14 428/500 |
| 2008/0188591 A1 | 8/2008 | Raymond et al. |
| 2009/0253860 A1* | 10/2009 | Birnbrich ............. C08G 59/182 524/612 |
| 2011/0195195 A1 | 8/2011 | Geisberger et al. |

FOREIGN PATENT DOCUMENTS

| CA | 2203313 | 10/1997 |
| CN | 101735706 | 6/2010 |
| CN | 102031051 | 4/2011 |
| EP | 0 000 605 | 2/1979 |
| EP | 0 272 595 | 6/1988 |
| EP | 0 301 716 | 2/1989 |
| EP | 0 346 742 | 12/1989 |
| EP | 0 426 383 | 5/1991 |
| EP | 2 028 244 | 2/2009 |
| EP | 2 058 172 | 5/2009 |
| EP | 2 520 599 | 11/2012 |
| GB | 2 028 830 | 3/1980 |
| JP | 59-174656 | 10/1984 |
| JP | 10-95954 | 4/1998 |
| JP | 11-228807 | 8/1999 |
| JP | 2008-248227 | 10/2008 |
| WO | 97/33931 | 9/1997 |
| WO | 2010/035641 | 4/2010 |
| WO | 2011/118792 | 9/2011 |

OTHER PUBLICATIONS

International Search Report dated Aug. 7, 2012 in International (PCT) Application No. PCT/EP2012/058172.
Burton et al., "Epox formualtions using Jeffamine Polyetheramines", URL: http://www.huntsman.com/performance_products/Media/Epoxy_Formulations_Using_JEFFAMINE_Polyetheramines.pdf, retrieved Sep. 7, 2011.
International Search Report dated Jun. 17, 2014 in International (PCT) Application No. PCT/EP2013/073096.

* cited by examiner

*Primary Examiner* — Megan McCulley
(74) *Attorney, Agent, or Firm* — Wenderoth, Lind & Ponack, L.L.P.

(57) ABSTRACT

The invention relates to a curing agent for epoxy resins which is an aqueous dispersion of a multifunctional amine AC having more than one primary amino group per molecule, and at least one moiety per molecule derived from the reaction of a compound C containing at least one reactive group which is preferably an epoxide group, with a molecule having at least one blocked primary amino group and at least one group which is reactive towards the at least one reactive group of compound C, which is selected from the group consisting of secondary amino groups >NH, of hydroxyl groups —OH, of mercaptan groups —SH, of amide groups —CO—NHR, where R can be hydrogen or an alkyl group having from one to twelve carbon atoms, of hydroxyester groups, and of acid groups, particularly of carboxyl groups —COOH, sulphonic acid groups —$SO_3H$, and phosphonic acid groups —$PO_3H_2$, and preferably, also moieties which are compatible with an epoxy resin, as well as a process for its preparation, and a method of use thereof.

23 Claims, No Drawings

AQUEOUS DISPERSIONS OF A MULTIFUNCTIONAL PRIMARY AMINE, PROCESS FOR ITS PREPARATION, AND USE THEROF

FIELD OF THE INVENTION

This invention relates to aqueous dispersions of a multifunctional primary amine, to a process for its preparation, and to a method of use thereof.

BACKGROUND OF THE INVENTION

Aqueous coating binders based on epoxy resins have been used in the coatings industry for many years. Two-pack epoxy coating compositions, both solvent-borne and water-borne, are used particularly for heavy duty corrosion protection of metal substrates, with preference on base metals that do not have other corrosion protection such as zinc coating. Such systems dry quickly providing a tough protective coating with excellent hardness. Coating compositions based on epoxy resins are used mainly for factory-cast iron, cast steel, and cast aluminium parts. The use of water-borne epoxy resin systems reduces exposure and flammability issues associated with solvent-borne coatings, as well as liberation of solvents upon application. Coating compositions based on epoxy resins are mainly used in automotive and industrial applications, such as pipelines, and fittings, due to their heat resistance, chemical resistance and also, mechanical strength. Other uses of epoxy resin-based coating compositions are, for example, in can coating for acidic goods. Coating compositions based on epoxy resins are also widely used as primers to improve the adhesion of paints especially on metal surfaces in automotive and marine applications where corrosion resistance is important. They can also be used for high performance and decorative flooring applications such as industrial floorings, and architectural floorings such as terrazzo.

Water-based epoxy coating compositions usually comprise a hydrophilically modified epoxy resin, and a compatible curing agent which itself is also hydrophilically modified. Hydrophilic modification of epoxy resins is usually effected by introduction of non-ionic hydrophilic moieties. The reason is that the commonly used ionic hydrophilising groups such as amino groups or acid groups which form ions in aqueous environment are reactive themselves with epoxide groups. Introduction of the commonly used poly(oxyethylene) blocks as hydrophilising moiety is a difficult step as strong acid catalysts, mostly Lewis acids such as boron trifluoride, or complexes thereof with ethers or amines, have to be used, and the process is difficult to control. Such chemistry has been described in EP 0 272 595 B1, and also, in EP 0 346 742 B1, for epoxy resins. Hydrophilic modification of curing agents based on adducts of epoxide-functional compounds and amines has been described, i.a., in EP 0 000 605 B1. Amine based curing agents for epoxy resins usually have primary, secondary, or also tertiary, amino groups that react with an epoxide group under formation of a beta-hydroxy amine structure or a betaine structure. The curing activity decreases from primary to secondary to tertiary amines. While it is possible to use multifunctional primary amines which are the most efficient amines due to their higher reaction rate, such as isophorone diamine or meta-xylylene diamine, as curing agents for epoxide-functional compounds, their high vapour pressure and unfavourable smell together with potential health hazards has barred their use in applications where no sufficient ventilation is available. Moreover, lack of compatibility of monomeric amines with epoxy resins has limited their usefulness. Secondary amines which stem from reaction of primary amines with epoxide-functional compounds have good compatibility with epoxy resins, yet suffer from lower curing speed compared to that of primary amines.

Polyamines containing ketimine blocked primary amine groups which free primary amine groups upon hydrolysis have been described in GB 2028830A, describing the use of those amines for the Michael addition reaction under curing conditions with compounds comprising alpha,beta ethylenically unsaturated groups in conjugation with carbonyl groups. The resinous compositions described therein can be used neat or in organic solvent or can be dispersed in water by converting the amine-groups to cationic groups with the aid of acetic acid.

However, the dispersions of polyamine resins described in GB 2028830A have the disadvantage of having a very low solid content. Moreover, when used as hardener in association with epoxy resins, the polyamine dispersions disclosed in GB 2028830A do not permit to obtain coatings having satisfactory water-resistance. Hence, the polyamines described in GB 2028830A are not suitable to be used as curing agent for epoxy resins in aqueous dispersions.

Hydrophilically modified multifunctional primary amines which are derived from adducts of epoxide-functional compounds and amines have been described in co-pending PCT application PCT/EP2012/058172. By a "hydrophilically modified" compound in the context of this PCT application, a chemical compound (including oligomeric or polymeric substances having a number average molar mass of at least 350 g/mol) is meant which comprises in its molecules, moieties of oligo- or polyoxyethylene segments, optionally in mixture with polyoxypropylene segments, in a sufficient amount to keep the said compound stably dispersed in aqueous dispersion for at least one week at room temperature (23° C.), i. e. without phase separation or formation of precipitate visible with the naked eye.

The synthesis of the preferred hydrophilically modified multifunctional primary amines described in this patent application involves a pre-reaction where a hydrophilic epoxy-functional intermediate is made by reacting a stoichiometric excess of a multifunctional epoxide such as the diglycidylether of bisphenol A, with a water-compatible di-hydroxy functional aliphatic polyether such as polyethylene glycol (alpha,omega-dihydroxy polyethyleneoxy ethylene, CAS No. 25322-68-3), its propylene analogue (alpha,omega-dihydroxy poly-1,2-propyleneoxy 1,2-propylene, CAS No. 25322-69-4), and mixtures or copolymers thereof, under catalysis with strong acids such as boron trifluoride or complexes thereof. This intermediate is then chain-extended by reaction with a multihydric phenol, preferably also bisphenol A, and the resulting multifunctional epoxide product is reacted with an amino compound which has at least two primary and at least one secondary amino group, where all primary amino groups are blocked by pre-reaction with a ketone to form a ketimine, leaving only the secondary amino groups as reactive amino groups.

It has been found in the experiments on which the present invention is based that due to the incorporation of the hydrophilic segment into the multifunctional amine, the variability of the system comprising an epoxy resin and the hydrophilically modified aminic curing agent which serves both as curing agent and as emulsifier for the epoxide resin, has become unduly limited.

Moreover, the aqueous dispersions of the multifunctional amines described in this patent application also suffer from the drawback that only low solid concentrations can be obtained. In addition the water resistance of epoxy coatings based on such hardeners should be improved.

It has therefore been the object of this invention to provide an aqueous dispersion of at least one multifunctional primary amine as curing agent suitable for curing epoxy resins which overcomes those problems.

It has further been an object of this invention to provide an aqueous dispersion of at least one multifunctional primary amine for epoxy resins, and an emulsifier which is able to emulsify the curing agent and, optionally, the epoxy resin, thus dispensing the need for internal hydrophilisation of either or both of the epoxy resin. In such system, the emulsifier has to exhibit good compatibility, and thus, emulsifying power for both the epoxide functional compound which constitutes the epoxy resin, and the amine-based curing agent therefor.

The problem has been solved by providing an aqueous dispersion comprising at least one non-ionic emulsifier and at least one multifunctional amine having at least two primary amino groups, and moieties derived from epoxy resins. These dispersions of multifunctional amines can be combined as curing agents with epoxy resins, and be dispersed in water, optionally in the presence of a further emulsifier.

SUMMARY OF THE INVENTION

The invention provides an aqueous dispersion of at least one multifunctional amine AC which may be used as curing agent for epoxy resins, which multifunctional amine AC has more than one primary amino group per molecule, and at least one non-ionic emulsifier F. The multifunctional amine AC further has at least one moiety per molecule derived from the reaction of a compound C containing at least one reactive group which is preferably an epoxide group, with a compound having at least one blocked primary amino group and at least one group which is reactive towards the at least one reactive group of compound C, which is preferably an epoxide group, and is selected from the group consisting of secondary amino groups >NH, of hydroxyl groups —OH, of mercaptan groups —SH, of amide groups —CO—NHR, where R can be hydrogen or an alkyl group having from one to twelve carbon atoms, of hydroxyester groups, and of acid groups, particularly of carboxyl groups —COOH, sulphonic acid groups —SO$_3$H, and phosphonic acid groups —PO$_3$H$_2$. Reaction of these groups with an epoxide group leads to formation of groups such as a tertiary hydroxyamine, a hydroxyether, a hydroxymercaptane, a hydroxyamide, and a hydroxyester, where the hydroxy group is in α or β-position to the amino, mercaptane, amide or ester group. The compound C comprises a mass fraction of oxyethylene and oxypropylene moieties of less than 5%.

The multifunctional amine AC has an average of more than one, preferably at least two, primary amino groups per molecule. The term "multifunctional amine" also comprises mixtures of amines, wherein there is an average of more than one, preferably at least two, primary amino groups per molecule. In a further preferred embodiment, the multifunctional amine AC has at least three primary amino groups, and particularly preferred, at least four primary amino groups.

A further object of the invention is a multi-step process to prepare an aqueous dispersion comprising at least one multifunctional amine AC having more than one primary amino group per molecule, by formation, in the first step, of a compound AB having at least one blocked primary amino group through reaction of an amine A having at least one primary amino group per molecule, and at least one further reactive group, preferably selected from the group consisting of secondary amino groups >NH, hydroxyl groups —OH, mercaptan groups —SH, amide groups —CO—NHR, where R can be hydrogen or an alkyl group having from one to twelve carbon atoms, hydroxyester groups, and acid groups, particularly carboxyl groups —COOH, sulphonic acid groups —SO$_3$H, and phosphonic acid groups —PO$_3$H$_2$, with a blocking agent B for the primary amino groups, preferably an aldehyde or a ketone, to form a compound which does not have residual primary amino groups, preferably, a Schiff base which may be an aldimine or ketimine, and reacting, in the second step, the amino functional compound AB having at least one blocked primary amino group and at least one further reactive group as detailed supra, with a compound C which has at least one functional group which react with the further reactive group of the amine A, which functional group in C is preferably an epoxide group, to form by reaction of the further reactive group in A with the functional group of C, an amino-functional compound ABC which has blocked primary amino groups. The amino-functional compound ABC is deblocked, in a further step, to form the multifunctional amine AC. A non-ionic emulsifier F is used in the process to disperse the multifunctional amine AC.

A still further object of the invention is an aqueous coating binder comprising an emulsifier F, an epoxide functional resin E, and a multifunctional primary amine AC as curing agent therefor which has more than one primary amino group per molecule, and which is preferably compatible with an epoxy resin.

A still further object of the invention is a method of use of the aqueous dispersion of the multifunctional primary amine AC as a curing agent for epoxide resins E, by adding an epoxide resin E, and optionally, further emulsifier, to the aqueous dispersion of the multifunctional primary amine AC comprising the non-ionic emulsifier F, homogenising the mixture ACE thus formed, and applying the mixture ACE to the surface of a substrate, followed by drying.

DETAILED DESCRIPTION OF THE PREFERRED EMBODIMENTS

In a preferred embodiment, the amino-functional compound ABC which has blocked primary amino groups can be deblocked to form a multifunctional amine AC by heating, or by addition of a deblocking compound D which liberates the blocked primary amino group. A particularly preferred choice for this deblocking compound D is water which hydrolyses a ketimine or aldimine under splitting off of the ketone or aldehyde, and re-formation of the primary amino groups in the multifunctional amine AC.

The multifunctional amine AC comprises a structural part derived from an amine, and preferably, a further structural part that provides compatibility with an epoxy resin.

In a preferred embodiment of the present invention, the multifunctional amine AC comprises a moiety that is compatible with the epoxy resin for which it is used as curing agent by virtue of structural similarity with the said epoxy resin. Such moieties have the same or a similar structure as the backbone of an epoxy resin, and preferably comprise groups by removing hydrogen atoms from hydroxyl groups of the following compounds: bisphenol A, bisphenol F, novolaks derived from phenol or cresol or mixtures of these.

A preferred way of linking the amine part to the amine AC is therefore to use a compound C having at least one, preferably two or more, of a functional group which is an epoxide group, such as the diglycidyl ether of bisphenol A, or an oligomeric epoxy resin having from two to ten repeating units of formula II infra. This way of linking combines the chemical attachment of amine part and the part that provides the desired compatibility with an epoxy resin at the same time. It has been found in the experiments underlying the present invention that the absence of hydrophilic groups, particularly the absence of moieties of oxyethylene and of oxypropylene, viz., —O—CH$_2$—CH$_2$— groups and —O—CH(CH$_3$)—CH$_2$— groups in the compounds C, improves the water resistance of coatings made with curing agents derived from amines AC, although the hardness development is faster. Therefore, the mass fraction of oxyethylene and of oxypropylene moieties in compound C is below 5%, preferably below 2%, and more preferred, below 1%, in which case such adverse effect has not been detected. The amines AC are most preferably substantially free of oxyethylene and of oxypropylene moieties.

An epoxide functional resin, in the context of the present invention, is defined as a substance having at least one epoxide group,

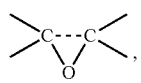 (Formula I)

per molecule, and preferably having a molar mass of at least 350 g/mol.

Preferred epoxy resins for the purpose of the present invention are epoxy resins based on multivalent phenolic compounds which are etherified with glycidyl alcohol, also referred to as glycidol, which is 2,3-epoxy-1-propanol. It is also possible to use esters of dibasic acids or multibasic acids with glycidol (2,3-epoxypropanol). Useful multivalent phenolic compounds are preferably dihydric phenols such as resorcinol, hydroquinone, 2,2-bis-(4-hydroxyphenyl)propane ("bisphenol A"), bis-(4-hydroxyphenyl)methane ("bisphenol F"), 4,4'-dihydroxybenzophenone, 4,4'-dihydroxydiphenyl sulphone ("bisphenol S"), and also, polyhydric phenolic compounds based on novolaks. Particularly preferred are epoxy resins based on bisphenol A, or on bisphenol F, and also, on mixtures of these. Such epoxy resins are made in the usual way by reacting epichlorohydrin with a multivalent phenolic compound having at least two phenolic hydroxyl groups per molecule, under formation of a structure —[—O—CH$_2$—CH(OH)—CH$_2$—O—Ar—]—, (Formula II)

where Ar stands for a divalent aromatic or mixed aromatic-aliphatic radical, which by way of example is —C$_6$H$_4$—C(CH$_3$)$_2$—C$_6$H$_4$— (Formula III)

in the case of bisphenol A,
or by the so-called advancement reaction where, e. g., the di-ether of bisphenol A and glycidol are reacted with further bisphenol A (or other multivalent phenolic compounds). Low molar mass epoxy resins as detailed here are a preferred component C for the present invention.

Structural similarity, also referred to herein as compatibility, with an epoxy resin E exists to a high degree if the amine AC comprises a structural element which is equal to that of Formula II, or one is a homologue of the other, such as in the case of a structural element derived from bisphenol A, and a structural element derived from bisphenol F. Another example of structural similarity is between an amine AC having a structure

[H$_2$N—(CH$_2$)$_4$]$_2$N—CO-Ph-SO$_2$-Ph-CO—O-Ph-SO$_2$-Ph-O—CO-Ph-SO$_2$-Ph-CO—N[(CH$_2$)$_4$—NH$_2$]$_2$ which is a tetrafunctional primary amine derived from bis-(4-aminobutyl)amine, bisphenol S, and sulphonyldibenzoic acid as coupling agent, on the one side, and on the other side, an epoxy resin that has moieties derived from bisphenol S also referred to as sulphonyldiphenol, or 4,4'-dihydroxydiphenyl sulphone.

In the preparation of the dispersion of the curing agent AC, it is also possible, in a further embodiment, to add monofunctional or multifunctional epoxide-functional compounds having a functionality of one (monofunctional) or of two and higher, to consume a part of the amino groups.

Useful mono-epoxy functional compounds are cresyl glycidyl ether, tert.-butylphenyl glycidyl ether, or the glycidyl ether of 2-methyl-2-hexanol, esters of glycidol with monocarboxylic aliphatic acids, particularly 2-ethylhexanoic acid, or highly branched saturated acids such as pivalic acid, 2,2-dimethylbutyric acid, 2,2-dimethylpentanoic acid, 2,2-dimethylhexanoic acid, 2,2-dimethylheptanoic acid, and 2,2-dimethyloctanoic acid, which are commercially available as Versatic® acids, or glycidyl functional silanes such as 3-glycidoxypropyl-trimethoxysilane. Multifunctional epoxide-functional compounds have a functionality of two or higher are preferably those derived from novolaks which are commercially available as D.E.N.® epoxy novolac resins from The Dow Chemical Company, but also diglycidylethers of Bis-A and bis-F can be used.

Beside the modification with epoxy functional compounds, the formation of Michael adducts can be considered by reacting primary amino groups of multifunctional amine AC with ethylenically unsaturated compounds like acrylic acid esters of C1 to C18 alcohols or acrylonitrile to form secondary amino groups.

Good compatibility of the amines AC with epoxy resins is achieved if there is at least one, preferably from two to five, consecutive units of formula II in the amine AC.

As usual, reaction of a primary amine R—NH$_2$ with an epoxide functional compound leads to a reaction product where the primary amino group is consumed, under formation of a structure

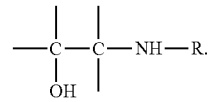

This reaction would consume all primary amino groups, and not lead to the desired functionality. For this reason, the primary amino groups must be protected from reaction with the epoxy groups when reacting the amine A with an epoxy-functional compound C. This is done in the present invention by a blocking agent B which can be removed, or split off, after the formation of the reaction product between the amine A and the multi-functional compound C.

The amines AC of the present invention having more than one primary amino group per molecule can therefore be made in a multi-step reaction where a multifunctional amine A having at least one, preferably two or more than two primary amino groups, and at least one further reactive group as detailed supra, preferably a secondary amino group, is first reacted with a blocking agent B that reacts selectively with primary amino groups, and does not react with the further reactive groups, particularly not with secondary amino groups. The reaction products AB therefore have only the further reactive group, preferably a secondary amino group, left as reactive amino groups. In a second step, the secondary amines AB are reacted with the, preferably at least difunctional, compounds C that react with the blocked amines AB under formation of adducts ABC which may be of the structure $C(AB)_n$, where n is at least one, preferably at least two. In a further embodiment, it is possible to use a substoichiometric amount of AB in the reaction with C. Residual functionality in C may then be reacted with secondary amines A' which do not have blocked primary amino groups, such as dialkylamines or cyclic amines such as piperidine or morpholine, or secondary amines that have additional functionality, such as secondary hydroxyamines, preferably N-alkylalkanolamines such as N-methylethanolamine and 4-hydroxypiperidine, or dihydroxyamines, preferably dialkylolamines such as diethanolamine or dipropanolamine, to form compounds according to $C(AB)_{n-x}A'_x$, n being the functionality of C which is at least two, and x being the number of amines A' in one molecule of $C(AB)_{n-x}A'_x$. In mixtures of AB and A' being reacted with C, x may, of course, also assume non-integer values.

Preferably, the amines A have at least two primary amino groups. In a preferred embodiment, the amines A may have two primary amino groups, and one secondary amino group as further reactive group. It is preferred to use diprimary monosecondary amines of the formula

$$H_2N-(CH_2)_n-NH-(CH_2)_{n'}-NH_2$$

with n and n' being integer numbers independently from 2 to 12, preferably from 3 to 8. One or more of the carbon atoms in the alkylene chain may be substituted with alkyl groups having from one to four carbon atoms, or alkoxy groups having from one to four carbon atoms. It is also possible to use amines of the formula

$$H_2N-(CH_2)_n-[NH-(CH_2)_{n'}]_{n''}-NH_2$$

with n and n' and n" being integer numbers independently from 2 to 12, preferably from 3 to 8. Preferred are diethylene triamine (1,5-diamino-3-azapentane), triethylene tetramine (1,8-diamino-3,6-diazaoctane), tetraethylene pentamine (1,11-diamino-3,6,9-triazaundecane), dipropylene triamine (1,7-diamino-4-azaheptane), tripropylene tetramine (1,11-diamino-4,8-diazaundecane), dibutylene triamine (1,9-diamino-5-azanonane), tributylene tetramine (1,14-diamino-5,10-diazatetradecane), dihexylene triamine (1,13-diamino-7-azatridecane), and trihexylene tetramine (1,20-diamino-7,14-diazaeicosane), and mixtures of these.

Particularly preferred amines A are diethylene triamine, N,N-bis(3-aminopropyl)amine, N,N-bis(4-aminobutyl) amine, N,N-bis(5-aminopentyl)amine, N,N-bis(6-aminohexyl)amine, N,N-bis(8-aminooctyl)amine, and N,N-bis (12-aminododecyl)amine, and higher oligomers of these which may be trialkylene tetramines, tetraalkylene pentamines, etc. Mixtures of these can also be used with preference.

It is further preferred that the amine A has at least one primary amino group, particularly preferred, at least two primary amino groups, and at least one secondary amino group, and that the compound C is difunctional, more preferably an epoxy compound.

In another preferred embodiment, the amine A has at least one primary amino group and one secondary amino group, and the compound C is at least trifunctional, more preferably an epoxy compound.

The blocking agents B are preferably aliphatic aldehydes and ketones having from two to twelve carbon atoms, more preferably ketones selected from the group consisting of acetone, methylethyl ketone, diethyl ketone, diisopropyl ketone, and methyl isobutyl ketone. An advantage of blocking with ketones or aldehydes is the cleavage of the Schiff bases formed by the action of water, which is a necessary step when dissolving or dispersing the blocked amine ABC in water. Water is therefore preferably used in this case as the deblocking agent D. The preferred ketones may easily be removed by distillation from the aqueous solution or dispersion of the amine AC. In the reaction to prepare the blocked amine AB, the amount of blocking agent B has to be selected such that a full conversion of the primary amino groups is reached. Full conversion, in the context of this invention, means that at least 95%, preferably at least 98%, and more preferably, at least 99%, of all primary amino groups in the amine A have been reacted with the blocking agent B.

The compound C has at least one, preferably at least two functional groups selected from the group consisting of carbonylhalogenide —CO—X, where X may be F, Cl, Br, or I, carboxylic acid anhydride —CO—O—CO—, isocyanate —N═C═O, epoxide, and aziridine. The compound C preferably is an epoxide containing at least one, preferably at least two epoxy groups. Useful compounds C are low molar mass epoxy resins, particularly diepoxides, as detailed supra, particularly such diepoxides that are derived from bisphenol A, bisphenol F, and of mixtures of these, such as bisphenol A diglycidyl ether, bisphenol F diglycidyl ether, by reaction with epichlorohydrin. A further preferred way of chemically linking the amine moieties is by using diglycidyl ethers of dihydric alcohols having four or more carbon atoms in the alcohol component or diglycidyl esters of aromatic or aliphatic dicarboxylic acids, such as 1,4-butane diol diglycidyl ether. A further useful multifunctional compound is an acrylic copolymer where glycidyl(meth)acrylate is one of the comonomers, where the average functionality and also the average degree of polymerisation can be easily controlled to yield the desired functionality.

With particular preference, the compound C is selected from the group consisting of halogenides of at least dibasic aromatic or aliphatic or cycloaliphatic acids, of glycidyl esters of at least dibasic aromatic or aliphatic or cycloaliphatic acids, of glycidyl ethers of at least dihydric phenols, of glycidyl ethers of at least dihydric aliphatic or cycloaliphatic alcohols, and of N,O-glycidyl hydroxyaromatic amines. If the compound C is an epoxide-functional epoxy resin, it is with preference the glycidyl ether according to the formula

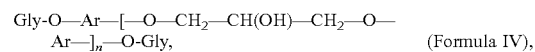
$$\text{Gly-O-Ar-[-O-CH}_2\text{-CH(OH)-CH}_2\text{-O-Ar-]}_n\text{-O-Gly,} \quad \text{(Formula IV)},$$

where n is an integer number of at least 0, preferably at least 1 and more preferably at least 2, and Ar is an arylene and may preferably be 1,3- or 1-4-phenylene, 2,2-di(phenyl-4-yl)propane, di(phenyl-4-yl)methane, di(phenyl-4-yl)sulphone, and Gly- stands for glycidyl, (Formula V)
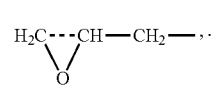

In formula IV, n is preferably not more than 10, more preferably not more than 5.

In a preferred embodiment, the amine AC can be made using a mixture of amines, where the blocked amine AB is reacted with the compound C in the presence of at least one of an additional amine A1 which is selected from the group consisting of dialkylamines having from one to twelve carbon atoms in the alkyl group, and of hydroxyfunctional secondary aliphatic amines, preferably bis(hydroxyalkyl) amines having from two to six carbon atoms in the hydroxyalkyl group, and of additional amine A2 which is selected from the group consisting of polyfunctional aliphatic amines having at least one tertiary amino group per molecule and at least one primary amino group per molecule, preferably N,N-dialkylamino alkyleneamines having from one to four carbon atoms in the alkyl groups, and from two to six carbon atoms in the alkylene group. If only one of A1 and A2 is present together with AB, the mass fraction of AB in the mixture of AB, A1, and A2 is at least 60%, and the mass fraction of A1 or A2 is not more than 40%. In a preferred embodiment, these mass fraction of AB is at least 70%, and the mass fractions of A1 or A2 are not more than 30%. If both A1 and A2 are present together with AB, the mass fraction of AB in the mixture of AB, A1, and A2 is at least 50%, and the mass fraction of A1 is not more than 30%, and the mass fraction of A2 is not more than 20%. In a preferred embodiment, these mass fractions are at least 60% for AB, and not more than 25% of A1 and not more than 15% of A2, respectively. Particularly preferred as amine A1 are diethylamine, dipropylamine, dibutylamine, diethanolamine, di-n-propanolamine, and diisopropanolamine, or their mixtures, and particularly preferred as amine A2 are N,N-dimethylaminoethylamine, N,N-dimethylaminopropylamine, N,N-dimethylaminobutylamine, N,N-diethylaminoethylamine, N,N-diethylaminopropylamine, and N,N-diethylaminobutylamine, and their mixtures.

For the preparation of two-pack epoxy resin systems, the amine AC is emulsified in water using an emulsifier F to yield an aqueous dispersion, and the epoxy resin E is then dispersed in the aqueous dispersion of the amine AC. Depending on the amount of emulsifier F used when dispersing the amine AC in water, it may be needed to add further emulsifier which is the same as or different from emulsifier F, before or together with the epoxy resin E.

It is possible, according to the intended application, to modify the reactivity of the multifunctional amine AC by adding small amounts of reactive diluents which are mono-epoxy functional compounds such as cresyl glycidyl ether, tert.-butylphenyl glycidyl ether, or the glycidyl ether of 2-methyl-2-hexanol, esters of glycidol with monocarboxylic aliphatic acids, particularly 2-ethylhexanoic acid, or highly branched saturated acids such as pivalic acid, 2,2-dimethylbutyric acid, 2,2-dimethylpentanoic acid, 2,2-dimethylhexanoic acid, 2,2-dimethylheptanoic acid, and 2,2-dimethyloctanoic acid, which are commercially available as Versatic® acids, or glycidyl functional silanes such as 3-glycidoxypropyl-trimethoxysilane. It is also possible to introduce a limited degree of branching by adding mass fractions of up to 10%, based on the sum of the masses of all epoxide-functional components according to E, of multifunctional epoxides such as those derived from novolaks which are commercially available as D.E.N.® epoxy novolac resins from The Dow Chemical Company.

The emulsifier F is a non-ionic emulsifier. Alternatively a combination of a non-ionic emulsifier F with an ionic emulsifier may be used.

The emulsifier F is preferably a non-ionic emulsifier where the hydrophilic portion comprises polyoxyalkylene moieties having two and/or three carbon atoms in the alkylene group, or a combination of a non-ionic and an ionic emulsifier. Non-ionic emulsifiers which can be used for this invention are preferably selected from the group consisting of monoesters of glycerol and fatty acids, ethoxylated fatty acids, ethoxylated fatty acid amides, ethoxylated fatty alcohols, ethoxylated alkyl phenols, and propoxylated analogues of these as well as mixed ethoxylated and propoxylated analogues of these.

Anionic emulsifiers which can be used for this invention are preferably selected from the group consisting of fatty acid salts, alkanolsulphates, fatty alcohol isethionates, alkali alkanesulphonates, alkylbenzene sulphonates, sulphosuccinic acid esters, alkanol ethoxylate-sulphates, and alkanol ethoxylate-phosphates. Cationic emulsifiers which can be used for this invention are tetraalkyl ammonium halogenides where at least one of the alkyl groups has from eight to forty carbon atoms, while the others preferably have from one to eight carbon atoms, quaternary carboxymethylated ammonium salts, and long chain alkyl substituted pyridinium salts such as lauryl pyridinium chloride. Preferred are combinations of anionic and non-ionic emulsifiers, and combinations of cationic and non-ionic emulsifiers.

Non-ionic emulsifiers are preferably selected from those comprising polyoxyalkylene moieties having two or three carbon atoms in the alkylene group or combinations thereof. Examples of such emulsifiers are block co-polymers of ethylene oxide and propylene oxide.

Non-ionic emulsifiers F are preferably selected from those having a weight average molar mass Mw of at least 3000 g/mol, more preferably of at least 6000 g/mol and most preferably of at least 10000 g/mol. The molar mass Mw is preferably not more than 25000 g/mol.

Preferred are non-ionic emulsifiers which are the condensation products obtained by condensation of polyether polyols, especially polyalkylene glycols, with glycidyl ethers, especially polyglycidyl ethers of bisphenols, and which have an epoxy equivalent of at least 50,000, preferably at least 100,000. Such condensation products may be obtained by the condensation of polyether polyols with the glycidyl ethers in the presence of catalysts based on a Lewis acid such as tetrafluoroboric acid, boron trifluoride, or complexes of boron trifluoride with diethylether or acetic acid. The polyalkylene glycols are preferably selected from those having an weight average molar mass Mw of at least 1000 g/mol, more preferably of at least 2000 g/mol and not more than 12000, most preferably not more than 8000 g/mol.

If non-ionic emulsifiers are used alone, particularly preferred are non-ionic emulsifiers made by reaction of low molar mass epoxy resins which are preferably derived from bisphenol A or bisphenol F or bisphenol S or their mixtures, preferably having two epoxide groups per molecule, and from one to ten repeating units, and dihydroxy polyoxyalkylenes having two or three carbon atoms in the alkylene group, viz., dihydroxy polyoxyethylene or dihydroxy polyoxypropylene, or dihydroxy-copolymers having both $C_2$- and $C_3$-alkylene groups in their polymer chain. This reaction is preferably catalysed by a Lewis acid such as boron trifluoride, or complexes of boron trifluoride with Lewis bases such as with ammonia or trimethylamine. A preferred emulsifier is made by reacting bisphenol A diglycidylether with dihydroxy polyoxyethylene where the latter has a number average molar mass of from 1 kg/mol to 20 kg/mol, particularly preferred of from 2 kg/mol to 10 kg/mol. Mixtures of two or more different dihydroxy polyoxyalkylenes and/or mixtures of two or more different low molar mass epoxy resins may also be used.

The non-ionic emulsifier F used to disperse the multifunctional amine AC in water can be added in different steps of the process. It can be added after the formation of the multifunctional amine AC obtained after deblocking the amino-functional compound ABC or before the formation of the multifunctional amine AC. It can be added to the compound C prior to the reaction with the compound AB having blocked primary amino groups.

The quantity of emulsifier F used in the aqueous composition is generally from about 2 to 15% by weight, preferably 3 to 10% by weight, referred to the multifunctional amine AC.

The two-pack epoxy systems according to this invention may be used for coating of metals, particularly base metals for which they provide excellent corrosion protection, high elasticity, and good hardness. It is believed that this combination of hardness and elasticity is due to the crosslink density which is defined by the average distance between the plurality of primary amino groups in the amine AC.

The aqueous dispersion of the two-pack epoxy system which is made ready for use by dispersing the epoxy resin E in the aqueous dispersion of the amine component AC and the emulsifier F, and optionally adding additives such as inorganic or organic pigments, functional pigments such as those based on zinc and on phosphate, fillers such as talc, wetting agents, defoamers, antisettling agents, viscosity modifiers, coalescing agents, and UV absorbers.

The two-pack systems made according to the invention are particularly useful for anti-corrosion coating of metals, and also for coating of mineral substrates such as concrete flooring or stone flooring.

The following examples are intended to illustrate the invention without limiting.

The mass fraction of solids $w_s$ was determined by drying a sample B with the mass of 1 g at 125° C. for one hour, and stating the ratio $m_R/m_B$ of the mass $m_R$ of the residue R after drying, and the mass $m_P$ of the sample B taken.

The specific content of epoxide groups was determined in the usual way by titration with tetraethylammonium bromide and perchloric acid in glacial acetic acid, as described by R. R. Jay, Anal. Chem. 36, (1964), pages 667 and 668, and stated as the ratio $n(EP)/m_B$ of the amount of substance $n(EP)$ of epoxide groups present in a sample B, and the mass $m_B$ of that sample B; its customary unit is "mol/kg".

The acid number is defined, according to DIN EN ISO 3682 (DIN 53 402), as the ratio $m_{KOH}/m_B$ of that mass $m_{KOH}$ of potassium hydroxide which is needed to neutralise the sample B under examination, and the mass $m_B$ of this sample B, or the mass $m_B$ of the solids in the sample in the case of a solution or dispersion; its customary unit is "mg/g".

The epoxy equivalent is defined as being the amount of substance, in g, which contains one equivalent of epoxy groups; it is measured according to DIN EN ISO 7142.

Example 1: Preparation of a Ketimine K1

103 g (1 mol) of diethylene triamine (DETA) and 300 g (3 mol) of methylisobutyl ketone (MIBK) were charged into a four-necked flask equipped with a mechanical stirrer, a Dean Stark trap, and a gas inlet, and heated to reflux for eight hours under a nitrogen flow. When no more water was collected, the excess MIBK was removed to yield the pure DETA-MIBK-ketimine.

Example 2: Preparation of an Emulsifier F1

195 g of polyethylene glycol (number average molar mass: 4000 g/mol) and 22 g of xylene were charged into a four-necked flask equipped with a mechanical stirrer, a Dean Stark trap, and a gas inlet, and heated to 125° C. When all polyethylene glycol was molten, 11 g of xylene were distilled off under reduced pressure. At 125° C., 0.3 g of fluoroboric acid (aqueous solution with a mass fraction of $HBF_4$ of 50%) were added to the mixture. After this addition, further 11 g of xylene were distilled off under reduced pressure. At 125° C., 19 g of bisphenol A diglycidyl ether (BADGE) were added. This temperature was maintained until a dynamic viscosity measured at 23° C. and a shear rate of 25 s$^{-1}$ of 3000 mPa·s was reached. The reaction mixture was cooled to 100° C., and 215 g of water were added. After cooling to room temperature (23° C.) the mass fraction of solids was determined to be 49.5%, and the dynamic viscosity measured at 23° C. and a shear rate of 100 s$^{-1}$ was 3700 mPa·s. No residual epoxy groups were detected, meaning that the epoxy equivalent was higher than 100,000.

Example 3: Preparation of an Epoxy-Amine Adduct ABC1

2433 g of bisphenol A diglycidyl ether (BADGE), 399 g of bisphenol A, and 538 g of emulsifier F1 of Example 2 were charged into a four-necked flask equipped with a mechanical stirrer. Water was removed by distillation under reduced pressure. 8.5 g of triphenyl phosphine were added and the mixture heated to 130° C. under stirring. This temperature was maintained for two hours until a specific content of epoxide groups of 2.98 mol/kg was reached. The reaction mixture was then cooled to 80° C. At this temperature, a mixture of 1334 g of the ketimine K1 of Example 1, 294 g of diethanolamine and 98 g of N,N-diethylaminopropylamine were added, the temperature was raised to 100° C., and stirring was continued for two hours. 95 g of BADGE were added to scavenge unreacted free amines, and the mixture was stirred at 100° C. for one further hour. The epoxy amine adduct ABC1 was then allowed to cool down.

Example 4: Dispersion of Epoxy-Amine Adduct ABC1 in Water to Prepare Amine Curing Agent Dispersion D1

At 95° C., 12 g of a mineral oil defoamer (Additol® VXW 6211, Allnex Austria GmbH) were added to 4934 g of the epoxy amine adduct ABC1 of Example 3. The mixture was homogenised for ten minutes and then cooled to 90° C. At this temperature, 800 g of water were added. The blocking agent MIBK was distilled of under reduced pressure of 100 hPa at approximately 90° C. When the distillation of MIBK had ceased, 4670 g of water were added. After cooling to room temperature (23° C.), the mass fraction of solids was determined to be 53.9%, and the dynamic viscosity measured at 23° C. and a shear rate of 100 s$^{-1}$ was 1788 mPa·s, the specific content of amine hydrogen atoms was 4.55 mol/kg, and the Z-average particle size of the dispersion was 870 nm.

Example 5: Preparation of an Epoxy-Amine Adduct ABC2

2433 g of bisphenol A diglycidyl ether (BADGE), 399 g of bisphenol A and 8.5 g of triphenyl phosphine were charged into a four-necked flask equipped with a mechanical stirrer. The mixture was heated to 130° C. under stirring. This temperature was maintained for two hours until a specific content of epoxide groups of 3.27 mol/kg was reached. The reaction mixture was then cooled to 80° C. At this temperature, a mixture of 1334 g of the ketimine K1 of Example 1, 294 g of diethanolamine and 98 g of N,N-diethylaminopropylamine were added, the temperature was raised to 100° C., and stirring was continued for two hours. 95 g of BADGE were added to scavenge unreacted free amines, and the mixture was stirred at 100° C. for one further hour. The epoxy amine adduct ABC2 was then allowed to cool down.

Example 6: Dispersion of Epoxy-Amine Adduct ABC2 in Water to Prepare Amine Curing Agent Dispersion D2

To 700 g of epoxy amine adduct ABC2 of Example 5, 11.8 g of Maxemul® 7201 (Alkylaryl sulphonate, Croda) and 47.2 g of Synperonic® PE/F 127 (polyalkylene oxide block copolymer made from ethylene oxide and propylene oxide, Croda) were added, and the mixture was heated to 85° C. The mixture was then homogenised for thirty minutes. At 85° C., 120 g of water were added. The blocking agent MIBK was distilled of under reduced pressure of 100 hPa at approximately 85° C. The mixture was then cooled to 80° C., and 737 g of water were added in small portions while dispersing under high shear. The temperature of the dispersion was allowed to drop to 50° C. and the mixture was dispersed for another fifteen minutes. After cooling to room temperature (23° C.), the mass fraction of solids was determined to be 65%, and the dynamic viscosity measured at 23° C. and a shear rate of 100 s$^{-1}$ was 1980 mPa·s, the specific content of amine hydrogen atoms was 4.43 mol/kg, and the Z-average particle size of the dispersion was 965 nm.

Example 7: Preparation of an Epoxy-Amine Adduct ABC3 (Comparative)

717 g of bisphenol A diglycidyl ether (BADGE) and 451 g of polyethylene glycol with a number average molar mass of 1000 g/mol were charged into a four-necked flask equipped with a mechanical stirrer and heated to 120° C. under stirring. When this temperature was reached, 2.6 g of borontrifluoride amine (BF$_3$.NH$_3$) were charged into the flask and the mixture was heated to 160° C. and maintained at this temperature until a specific content of epoxide groups of 2.41 mol/kg was reached. The reaction mixture was then cooled to 50° C. 1889 g of bisphenol A diglycidyl ether (BADGE), 399 g of bisphenol A, and 8.5 g of triphenyl phosphine were charged into the reaction flask. The mixture was then heated to 130° C. under stirring. This temperature was maintained for two hours until a specific content of epoxide groups of 2.68 mol/kg was reached. The reaction mixture was then cooled to 80° C. At this temperature, a mixture of 1334 g of the ketimine K1 of Example 1, 294 g of diethanolamine and 98 g of N,N-diethylaminopropylamine were added, the temperature was raised to 100° C., and stirring was continued for two hours. 95 g of BADGE were added to scavenge unreacted free amines, and the mixture was stirred at 100° C. for one further hour. The epoxy amine adduct ABC3 was then allowed to cool down.

Example 8: Dispersion of Epoxy-Amine Adduct ABC3 in Water to Prepare Amine Curing Agent Dispersion D3 (Comparative)

At 95° C., 12 g of a mineral oil defoamer (Additol® VXW 6211, Allnex Austria GmbH) were added to 5287 g of the epoxy amine adduct ABC3 of Example 7. The mixture was homogenised for ten minutes and then cooled to 90° C. At this temperature, 800 g of water and 338 g of an aqueous solution of lactic acid having a mass fraction of 50% were added. MIBK was distilled of under reduced pressure of 100 hPa at approximately 90° C. When the distillation of MIBK had ceased, 15.6 kg of water were added. After cooling to room temperature (23° C.), the mass fraction of solids was determined to be 21.9%, and the dynamic viscosity measured at 23° C. and a shear rate of 100 s$^{-1}$ was 344 mPa·s, the specific content of amine hydrogen atoms was 4.07 mol/kg, and the Z-average particle size of the dispersion was 75 nm.

Example 9: Preparation of an Epoxy-Amine Adduct According Example II of GB 2028 830A and Dispersion Thereof to Prepare Amine Curing Agent Dispersion D4 (Comparative 2)

470.0 g of EPON 1001 (Polyglycidyl ether of Bisphenol-A having an epoxy equivalent weight of 470 and a molecular weight of about 940) and 373.2 g of methyl isobutyl diketimine of diethylene triamine dissolved in methyl isobutyl ketone (73% by weight resin solids) were mixed together in a 1:1 equivalent ratio and stirred until all the EPON dissolved. The mixture was heated up to 100° C. and held for 1 hour, cooled down to 50° C. and thinned with 100 g methyl isobutyl ketone. The mixture was heated to 100° C., held for 20 minutes and cooled to room temperature.

To 603.8 g of the obtained reaction mixture (containing 475 g of the epoxy amine adduct) 28.0 g acetic acid (23% total theoretical neutralization) and 479.1 g water were added and heated up to 90° C. in order to regenerate the primary amino groups. MIBK/water mixture was distilled of under reduced pressure of 100 hPa at approximately 90° C. When the distillation of MIBK had ceased, 467.3 g of water were added. After cooling to room temperature (23° C.), the mass fraction of solids was determined to be 35.2%, and the dynamic viscosity measured at 23° C. and a shear rate of 100 s$^{-1}$ was 270 mPa·s, the specific content of amine hydrogen atoms was 6.98 mol/kg, and the Z-average particle size of the dispersion was 25 nm.

TABLE 1

| Summary of Dispersion Characteristics | | | | |
| --- | --- | --- | --- | --- |
| | D1 | D2 | D3 | D4 |
| Mass Fraction of Solids | 53.9% | 65% | 21.9% | 35.2% |
| Viscosity | 1788 mPa · s | 1980 mPa · s | 344 mPa · s | 270 mPa · s |
| Specific Amount of Substance of NH Groups | 4.55 mol/kg | 4.43 mol/kg | 4.07 mol/kg | 6.98 mol/kg |
| Particle Size | 870 nm | 965 nm | 75 nm | 25 nm |

Example 10: Clear Coat Testing

For clear coat evaluation, the dispersions D1 through D4 were mixed with a commercial epoxy dispersion E1, having a mass fraction of solids in the dispersion of 57% and a specific amount of substance of epoxy groups in the dispersion of 1.33 mol/kg ("epoxy equivalent weight" of 750 g/mol as supplied). The ratio n(NH)/n(EP) of the amount of substance n(NH) of active aminic hydrogen groups (N—H) to the amount of substance n(EP) of epoxide groups in the mixture as prepared was set to 1 mol/1 mol. Immediately after mixing, the clear coat films were applied to glass panels in a wet film thickness of 200 μm. After 24 hours drying at room temperature (23° C.), the panels were subjected to a water immersion test for 24 hours at room temperature. The following data were found:

TABLE 2

Clear Coat Test Results

|  | D1 | D2 | D3 (comparative) | D4 (comparative) |
|---|---|---|---|---|
| Dustfree time | 32 min | 35 min | 33 min | 31 min |
| Tackfree time | 150 min | 146 min | 90 min | 98 min |
| Pendulum hardness (König) | | | | |
| After 24 h, 23° C. | 132 s | 129 s | 155 s | 158 s |
| After 48 h, 23° C. | 144 s | 142 s | 160 s | 172 s |
| 24 h water immersion test at 23° C. after 24 h room temperature drying | | | | |
| Pendulum hardness above water line | 125 s | 132 s | 86 s | 82 s |
| Pendulum hardness immersed surface | 87 s | 95 s | 75 s | 52 s |
| Surface aspect of immersed surface | ok | ok | strong blistering | very strong blistering |

It can be seen in the comparison between D1, D2 and D3, D4 that higher solids contents can be achieved with external emulsifiers (see Table 1).

In the clearcoat evaluation, the externally emulsified amine dispersions D1 and D2 performed a lot better in the water immersion test than D3, which is stabilised with an emulsifier built into the polymer backbone and also a lot better than D4. This is surprising as the drying characteristic as well as the hardness development suggest a better reactivity and curing rate of the clearcoat cured with D3 versus the ones cured with D1 and D2. Nevertheless the clearcoats based on D3 and D4 showed strong blistering after 24 h water immersion test, whereas the ones based on D1 and D2 showed no attack. The clearcoat composition based on amine dispersion D4 gelled within 30 minutes, whereas the compositions based on dispersions D1 and D2 were stable for more than 50 minutes.

The invention claimed is:

1. A multi-step process to prepare a curing agent by formation, in the first step, of a compound (AB) having at least one blocked primary amino group through reaction of an amine (A) having at least one primary amino group per molecule, and at least one further reactive group selected from the group consisting of secondary amino groups >NH, hydroxyl groups —OH, mercaptan groups —SH, amide groups —CO—NHR, where R is hydrogen or an alkyl group having from one to twelve carbon atoms, hydroxyester groups, and acid groups, with a blocking agent (B) for the primary amino groups, to form a compound which does not have residual primary amino groups, and reacting, in the second step, the amino functional compound (AB) having at least one blocked primary amino group and at least one further reactive group as detailed supra, with a compound (C) which has at least one functional group which reacts with the further reactive group of the amine (A), to form by reaction of the further reactive group in (A) with the functional group of (C), an amino-functional compound (ABC) which has blocked primary amino groups, and deblocking, in a further step, the amino functional compound (ABC) to form the multifunctional amine (AC), and dispersing the amine (AC) in water with the aid of at least one non-ionic emulsifier (F), wherein the hydrophilic portion of the non-ionic emulsifier (F) comprises polyoxyalkylene moieties having two and/or three carbon atoms in the alkylene group, wherein the amine (AC) is made by using a mixture of amines, where the blocked amine (AB) is reacted with the compound (C) in the presence of at least one of an additional amine (A1), and an additional amine (A2), wherein the addition amine (A1) is selected from the group consisting of dialkylamines having from one to twelve carbon atoms in the alkyl group, and of hydroxyfunctional secondary aliphatic amines, and wherein the additional amine (A2) is selected from the group consisting of polyfunctional aliphatic amines having at least one tertiary amino group per molecule and at least one primary amino group per molecule, and wherein the curing agent is a curing agent for epoxy resins which is an aqueous dispersion of at least one multifunctional amine (AC) having more than one primary amino group per molecule, and at least one moiety per molecule derived from the reaction of a compound (C) containing at least one reactive group, with a compound having at least one blocked primary amino group and at least one group which is reactive towards the at least one reactive group of compound (C), which at least one reactive group is selected from the group consisting of secondary amino groups >NH, of hydroxyl groups —OH, of mercaptan groups —SH, of amide groups —CO—NHR, where R is hydrogen or an alkyl group having from one to twelve carbon atoms, of hydroxyester groups, and of acid groups, characterised in that the mass fraction of oxyethylene and of oxypropylene moieties in compound (C) is below 5%, and wherein the aqueous dispersion comprises at least one non-ionic emulsifier (F), wherein the hydrophilic portion of the non-ionic emulsifier (F) comprises polyoxyalkylene moieties having two and/or three carbon atoms in the alkylene group.

2. The multi-step process of claim 1 wherein the compound (C) has at least two functional groups selected from the group consisting of carbonylhalogenide, carboxylic acid anhydride, isocyanate, epoxide, and aziridine.

3. The multi-step process of claim 1 wherein the amine (A) has at least two primary amino groups and at least one secondary amino group, and where the compound (C) is difunctional.

4. The multi-step process of claim 1 wherein the amine (A) is selected from the group consisting of diethylene triamine, triethylene tetramine, tetraethylene pentamine, dipropylene triamine, tripropylene tetramine, dibutylene triamine, tributylene tetramine, dihexylene triamine, trihexylene tetramine, and mixtures of any of these.

5. The multi-step process of claim 1 wherein the compound (C) is selected from the group consisting of halogenides of at least dibasic aromatic or aliphatic or cycloaliphatic acids, of glycidyl esters of at least dibasic aromatic or aliphatic or cycloaliphatic acids, of glycidyl ethers of at least dihydric phenols, of glycidyl ethers of at least dihydric aliphatic or cycloaliphatic alcohols, and of N,O-glycidyl hydroxyaromatic amines.

6. The multi-step process of claim 1 wherein the non-ionic emulsifier (F) comprises polyoxyalkylene moieties having two or three carbon atoms in the alkylene group, or combinations thereof.

7. The multi-step process of claim 1 wherein a monoepoxy-functional compound is added to the amine (AC).

8. The multi-step process of claim 1 wherein the compound (C) contains at least one epoxide group.

9. The multi-step process of claim 8 wherein the compound (C) is the glycidyl ether of an epoxy resin having at least one repeating unit.

10. The multi-step process of claim 1 wherein the non-ionic emulsifier (F) is made by reaction of low molar mass epoxy resins and dihydroxy polyoxyalkylenes having two or three carbon atoms in the alkylene group.

11. An aqueous coating binder comprising the aqueous dispersion comprising at least one emulsifier (F), and at least one multifunctional primary amine (AC) obtained by the process of claim 1 and an epoxide functional resin (E), as curing agent therefor.

12. A method of use of the aqueous dispersion comprising a multifunctional primary amine (AC) prepared by the process according to claim 1 as a curing agent for epoxy resins (E), comprising adding an epoxide resin (E) to the aqueous dispersion of the multifunctional primary amine (AC), homogenising the mixture (ACE) thus formed, and applying the mixture (ACE) to the surface of a substrate.

13. A multi-step process to prepare a curing agent by formation, in the first step, of a compound (AB) having at least one blocked primary amino group through reaction of an amine (A) having at least one primary amino group per molecule, and at least one further reactive group selected from the group consisting of secondary amino groups >NH, hydroxyl groups —OH, mercaptan groups —SH, amide groups —CO—NHR, where R is hydrogen or an alkyl group having from one to twelve carbon atoms, hydroxyester groups, and acid groups, with a blocking agent (B) for the primary amino groups, to form a compound which does not have residual primary amino groups, and reacting, in the second step, the amino functional compound (AB) having at least one blocked primary amino group and at least one further reactive group as detailed supra, with a compound (C) which has at least one functional group which reacts with the further reactive group of the amine (A), to form by reaction of the further reactive group in (A) with the functional group of (C), an amino-functional compound (ABC) which has blocked primary amino groups, and deblocking, in a further step, the amino functional compound (ABC) to form the multifunctional amine (AC), and dispersing the amine (AC) in water with the aid of at least one non-ionic emulsifier (F), wherein the hydrophilic portion of the non-ionic emulsifier (F) comprises polyoxyalkylene moieties having two and/or three carbon atoms in the alkylene group, wherein the non-ionic emulsifier (F) is made by reaction of low molar mass epoxy resins and dihydroxy polyoxyalkylenes having two or three carbon atoms in the alkylene group, and wherein the curing agent is a curing agent for epoxy resins which is an aqueous dispersion of at least one multifunctional amine (AC) having more than one primary amino group per molecule, and at least one moiety per molecule derived from the reaction of a compound (C) containing at least one reactive group, with a compound having at least one blocked primary amino group and at least one group which is reactive towards the at least one reactive group of compound (C), which at least one reactive group is selected from the group consisting of secondary amino groups >NH, of hydroxyl groups —OH, of mercaptan groups —SH, of amide groups —CO—NHR, where R is hydrogen or an alkyl group having from one to twelve carbon atoms, of hydroxyester groups, and of acid groups, characterised in that the mass fraction of oxyethylene and of oxypropylene moieties in compound (C) is below 5%, and wherein the aqueous dispersion comprises at least one non-ionic emulsifier (F), wherein the hydrophilic portion of the non-ionic emulsifier (F) comprises polyoxyalkylene moieties having two and/or three carbon atoms in the alkylene group.

14. The multi-step process of claim 13 wherein the compound (C) has at least two functional groups selected from the group consisting of carbonylhalogenide, carboxylic acid anhydride, isocyanate, epoxide, and aziridine.

15. The multi-step process of claim 13 wherein the amine (A) has at least two primary amino groups and at least one secondary amino group, and where the compound (C) is difunctional.

16. The multi-step process of claim 13 wherein the amine (A) is selected from the group consisting of diethylene triamine, triethylene tetramine, tetraethylene pentamine, dipropylene triamine, tripropylene tetramine, dibutylene triamine, tributylene tetramine, dihexylene triamine, trihexylene tetramine, and mixtures of any of these.

17. The multi-step process of claim 13 wherein the amine (AC) is made by using a mixture of amines, where the blocked amine (AB) is reacted with the compound (C) in the presence of at least one of
an additional amine (A1), and
an additional amine (A2),
wherein the addition amine (A1) is selected from the group consisting of dialkylamines having from one to twelve carbon atoms in the alkyl group, and of hydroxyfunctional secondary aliphatic amines, and
wherein the additional amine (A2) is selected from the group consisting of polyfunctional aliphatic amines having at least one tertiary amino group per molecule and at least one primary amino group per molecule.

18. The multi-step process of claim 13 wherein the compound (C) is selected from the group consisting of halogenides of at least dibasic aromatic or aliphatic or cycloaliphatic acids, of glycidyl esters of at least dibasic aromatic or aliphatic or cycloaliphatic acids, of glycidyl ethers of at least dihydric phenols, of glycidyl ethers of at least dihydric aliphatic or cycloaliphatic alcohols, and of N,O-glycidyl hydroxyaromatic amines.

19. The multi-step process of claim 18 wherein the compound (C) is the glycidyl ether of an epoxy resin having at least one repeating unit.

20. The multi-step process of claim 13 wherein a mono-epoxy-functional compound is added to the amine (AC).

21. The multi-step process of claim 13 wherein the compound (C) contains at least one epoxide group.

22. An aqueous coating binder comprising the aqueous dispersion comprising at least one emulsifier (F), and at least one multifunctional primary amine (AC) obtained by the process of claim 13 and an epoxide functional resin (E), as curing agent therefor.

23. A method of use of the aqueous dispersion comprising a multifunctional primary amine (AC) prepared by the process according to claim 13 as a curing agent for epoxide resins (E), comprising adding an epoxide resin (E) to the aqueous dispersion of the multifunctional primary amine (AC), homogenising the mixture (ACE) thus formed, and applying the mixture (ACE) to the surface of a substrate.

* * * * *